(12) United States Patent
Johnston et al.

(10) Patent No.: US 11,877,154 B2
(45) Date of Patent: Jan. 16, 2024

(54) IDENTIFYING TRUSTED SERVICE SET IDENTIFIERS FOR WIRELESS NETWORKS

(71) Applicant: Cisco Technology, Inc., San Jose, CA (US)

(72) Inventors: Jay K. Johnston, Raleigh, NC (US); Jerome Henry, Pittsboro, NC (US); David C. White, Jr., St. Petersburg, FL (US); Magnus Mortensen, Cary, NC (US); John M. Swartz, Lithia, FL (US); Robert E. Barton, Richmond (CA)

(73) Assignee: Cisco Technology, Inc., San Jose, CA (US)

( * ) Notice: Subject to any disclaimer, the term of this patent is extended or adjusted under 35 U.S.C. 154(b) by 376 days.

(21) Appl. No.: 16/810,551

(22) Filed: Mar. 5, 2020

(65) Prior Publication Data
US 2021/0282014 A1    Sep. 9, 2021

(51) Int. Cl.
*H04W 12/08* (2021.01)
*G06N 20/00* (2019.01)

(52) U.S. Cl.
CPC ............ *H04W 12/08* (2013.01); *G06N 20/00* (2019.01)

(58) Field of Classification Search
CPC ... H04W 12/08; H04W 12/06; H04W 12/062; H04W 12/069; H04W 12/104; H04W 12/73
See application file for complete search history.

(56) References Cited

U.S. PATENT DOCUMENTS

| 7,558,960 | B2 * | 7/2009 | Cam Winget ......... H04W 12/10 713/160 |
| 8,655,312 | B2 | 2/2014 | Stahlberg et al. |
| 9,197,420 | B2 | 11/2015 | Cross et al. |
| 9,578,513 | B2 | 2/2017 | VanBlon et al. |
| 9,705,913 | B2 | 7/2017 | Mirashrafi et al. |
| 10,148,672 | B2 | 12/2018 | Deshpande et al. |
| 2005/0141498 | A1 | 6/2005 | Winget et al. |

(Continued)

FOREIGN PATENT DOCUMENTS

| CN | 103096301 A | 5/2013 |
| CN | 106162644 A | 11/2016 |

(Continued)

OTHER PUBLICATIONS

PCT Notification of Transmittal of the International Search Report and the Written Opinion of the International Searching Authority, or the Declaration for Application No. PCT/US2021/070242 dated Jul. 28, 2021.

(Continued)

*Primary Examiner* — Olugbenga O Idowu
(74) *Attorney, Agent, or Firm* — Patterson + Sheridan, LLP

(57) ABSTRACT

Techniques for identifying a trusted SSID for a wireless network are disclosed. Prior to establishing a connection with a wireless network comprising a service set identifier (SSID), a network message is received at a wireless station (STA), from an access point (AP) associated with the wireless network. The STA identifies an encrypted identifier in the network message. The STA validates the encrypted identifier, and in response determines that the AP corresponds to a trusted wireless network. The SSID is designated as trusted, at the STA.

17 Claims, 9 Drawing Sheets

(56) References Cited

U.S. PATENT DOCUMENTS

| | | | |
|---|---|---|---|
| 2010/0146614 A1* | 6/2010 | Savoor | H04L 9/3263 726/10 |
| 2016/0080378 A1 | 3/2016 | VanBlon et al. | |
| 2019/0044737 A1* | 2/2019 | Singhi | H04L 9/0825 |

FOREIGN PATENT DOCUMENTS

| | | |
|---|---|---|
| CN | 106162649 A | 11/2016 |
| CN | 106330828 A | 1/2017 |
| CN | 115244896 A | 10/2022 |
| KR | 20040049533 A | 6/2004 |
| WO | 2016029668 A1 | 3/2016 |

OTHER PUBLICATIONS

PCT Invitation To Pay Additional Fees, And, Where Applicable Protest Fees for Application No. PCT/US2021/070242 dated Jun. 7, 2021.

Srinivasan Avinash et al, "VOUCH-AP: privacy preserving open-access 802.11 public hotspot AP authentication mechanism with co-located evil-twins," International Journal of Security and Networks (IJSN), vol. 13, No. 3, Jul. 28, 2018, p. 153.

Zhou et al., "Detecting Roque AP with the Crowd Wisdom," Conference Paper, ResearchGate Jun. 2017, 7 pages.

Office Action—Notice of Intention to Grant for European Application No. 21714790.9, dated Sep. 27, 2023, 8 Pages.

Chinese Patent Office, First Office Action for Application 202180018120.2 dated Jul. 24, 2023.

Tao Zhengrong et al., "The Safety Analysis of Wireless LAN Network," Communications Electronics, Dated Apr. 25, 2011, pp. 1-3 [Abstract in English].

\* cited by examiner

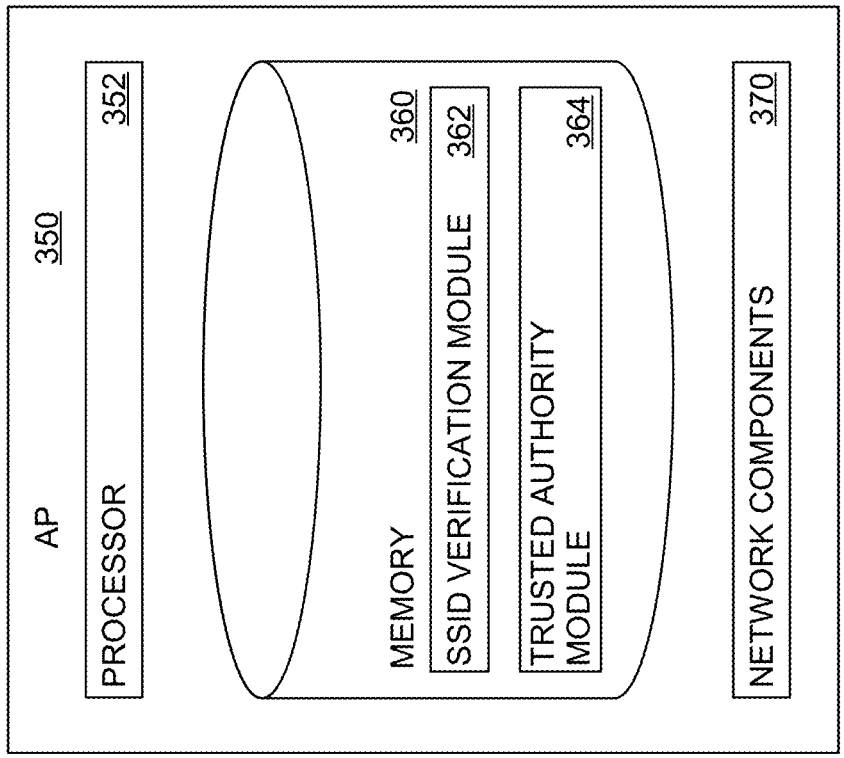
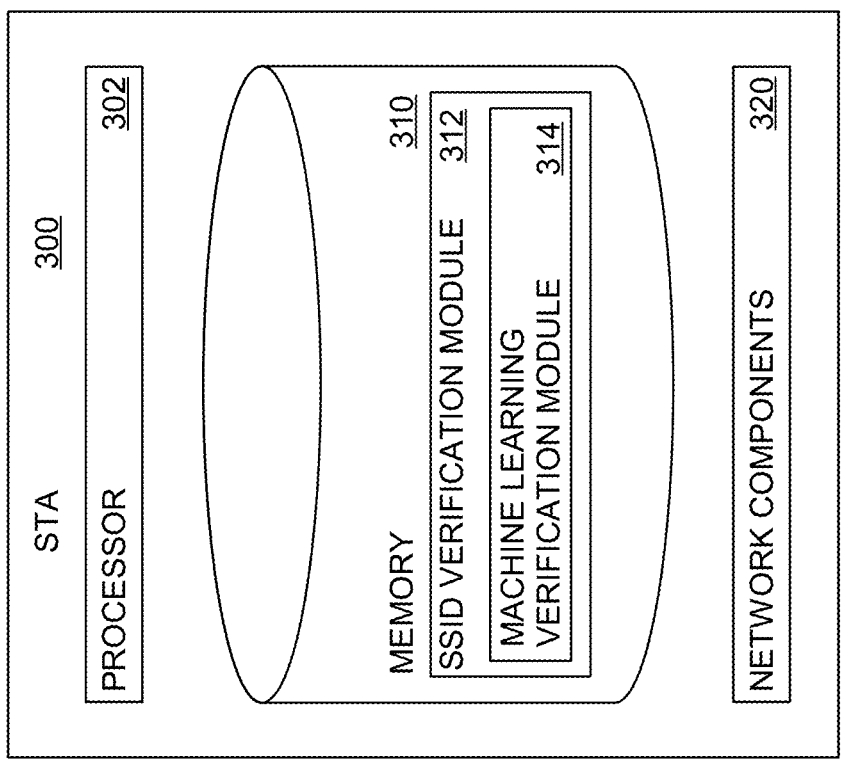
FIG. 3

US 11,877,154 B2

IDENTIFYING TRUSTED SERVICE SET IDENTIFIERS FOR WIRELESS NETWORKS

TECHNICAL FIELD

Embodiments presented in this disclosure generally relate to wireless communications. More specifically, one or more embodiments disclosed herein relate to identifying trusted or suspicious service set identifiers (SSIDs) for wireless networks.

BACKGROUND

WiFi networks are typically identified using an SSID. It can be very difficult for an end user, visiting a new location or presented with a new WiFi network, to distinguish between malicious and trusted SSIDs. There is a risk that a user will erroneously connect to a malicious network, creating a security risk for the user and for associated entities (e.g., the user's employer or others).

For example, when an end user arrives at a new location (e.g., a hotel, airport, coffee shop, etc.) the user may see many different SSIDs advertised for WiFi networks. The user's WiFi utility (e.g., in their smartphone, tablet, or computer) may show an assortment of seemingly similar names, some of which are legitimate and some of which are malicious. Further, some of the malicious SSIDs may be specifically named to impersonate legitimate networks, making it even more difficult for a user to identify the legitimate network(s).

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIG. 3 is a block diagram illustrating a wireless STA and a wireless access point, according to one embodiment.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
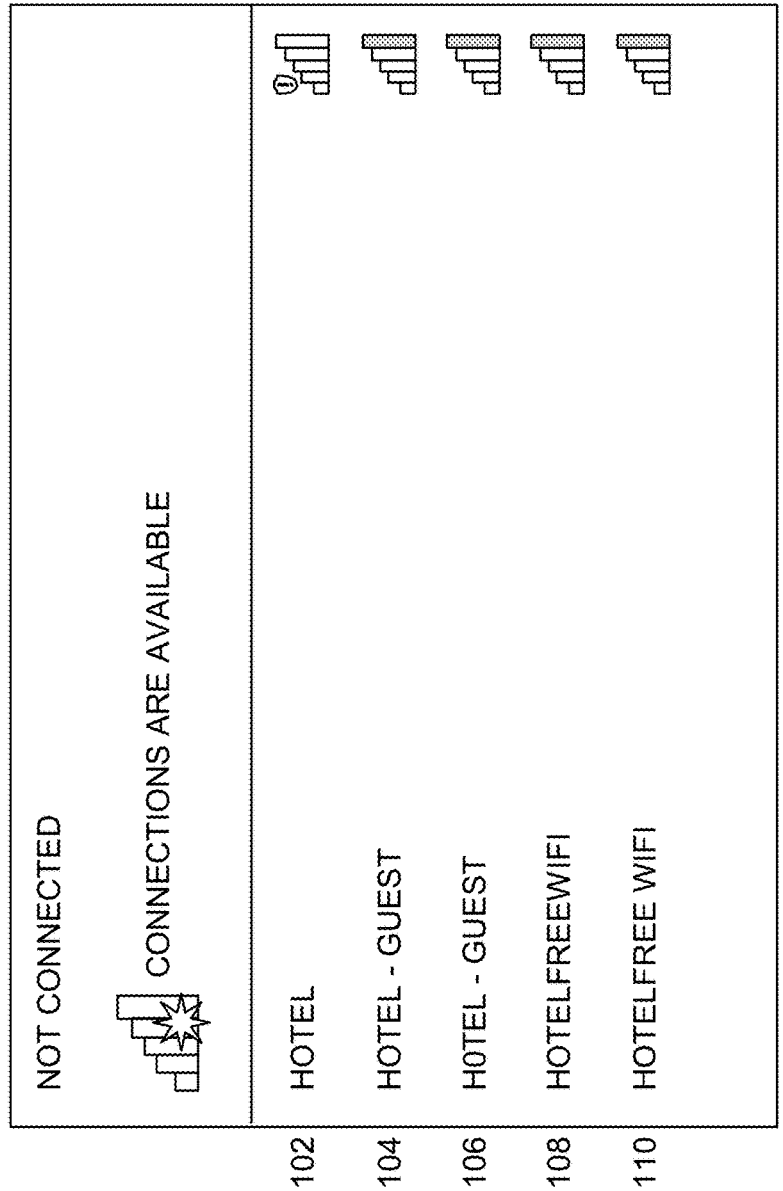
FIG. 1 illustrates a listing of trusted and malicious SSIDs for WiFi networks, according to one embodiment.

Embodiments include a method of identifying a trusted SSID for a wireless network. The method includes, prior to establishing a connection with a wireless network comprising a service set identifier (SSID), receiving a network message at a wireless station (STA) from an access point (AP) associated with the wireless network. The method further includes identifying, at the STA, an encrypted identifier in the network message. The method further includes validating, at the STA, the encrypted identifier, and in response determining that the AP corresponds to a trusted wireless network. The method further includes designating the SSID as trusted at the STA.

Embodiments further include an STA, including a processor and a memory storing a program, which, when executed on the processor, performs an operation. The operation includes, prior to establishing a connection with a wireless network comprising an SSID, receiving a network message from an AP associated with the wireless network. The operation further includes identifying an encrypted identifier in the network message. The operation further includes validating the encrypted identifier, and in response determining that the AP corresponds to a trusted wireless network. The operation further includes designating the SSID as trusted.

Embodiments further include an STA, including a processor and a memory storing a program, which, when executed on the processor, performs an operation. The operation includes, prior to establishing a connection with a wireless network, receiving a first network message from a first AP identifying a first SSID associated with a first wireless network. The operation further includes receiving a second network message from a second AP identifying a second SSID associated with a second wireless network. The operation further includes determining a visual similarity between a first visual representation of the first SSID and a second visual representation of the second SSID. The operation further includes designating the second SSID as suspicious based on the determined visual similarity.

EXAMPLE EMBODIMENTS

One or more embodiments disclosed herein relate to techniques for a wireless station (STA) (e.g., a user device) to verify the authenticity of advertised SSIDs. For example, in an embodiment, a vendor-specific attribute field can be provided in a beacon or probe response, and utilized by a wireless access point (AP) to advertise authenticated information to an STA wishing to join the WiFi network. The STA wishing to join the WiFi network can use the advertised information to verify (e.g., via public key cryptography) the authenticity of the AP. The STA can then join the network only if it is verified, or can provide a warning to the user.

In an embodiment, this verification can be done in several different ways. In one example, the STA can use a whitelist and keying information provided by a vendor (e.g., in a mobile App provided by a vendor, like a hotel chain). In another example, the STA can use OpenRoaming or another trusted third party to verify the authenticity of the AP associated with the questionable SSID. As another example, the STA can use a trusted vendor (e.g., a location based platform like Cisco DNA Spaces) to identify keying material and validate the AP.

Further, in an embodiment, an STA can use machine learning (ML) to assist a user in identifying trusted SSIDs. For example, the STA can use ML to identify SSIDs that appear to be close to a known trusted network, but actually differ, and can discourage a user from joining these SSIDs. In an embodiment, this is done in combination with identifying trusted SSIDs. In this embodiment, trusted SSIDs are identified and a user is encouraged to join these networks (e.g., using a positive flag or graphical indicator) while suspicious SSIDs are also identified and a user is discouraged from joining these networks (e.g., using a negative flag or graphical indicator). Alternatively, or in addition, the ML techniques can be used without identifying trusted SSIDs. For example, multiple SSIDs with similar names can be identified, and a user can be provided a warning or encouraged to be cautious with joining any of these SSIDs.

In an embodiment, computer vision techniques can be used to identify trusted SSIDs. For example, it is common for malicious entities to create SSIDs that appear to be similar to trusted SSIDs but use different underlying characters. A malicious actor might replace a letter "O" with a number "0", might replace a letter "I" with a number "1", or might include additional spaces, underscores, or other characters that are hard for a user to identify visually. Computer vision techniques can be used to examine graphical images of the advertised SSIDs, and can identify SSIDs that look similar visually (e.g., by comparing the images) but use different underlying characters. These SSIDs can be marked as suspicious, removed, or otherwise identified as potentially malicious. In an embodiment, ML can be used along with computer vision techniques to identify suspicious (or trusted) SSIDs.

FIG. 1 illustrates a listing 100 of trusted and malicious SSIDs for WiFi networks, according to one embodiment. In an embodiment, a user is visiting a hotel and is presented with numerous SSIDs for potential WiFi networks. For example, the SSID 102 ("Hotel") may identify a WiFi network used by hotel employees, while the SSID 104 ("Hotel—Guest") identifies a valid WiFi network for use by guests. But the SSID 106 ("HOTEL—GUEST"), which includes a number "0" in place of the letter "O", may identify a malicious or inauthentic WiFi network. It may be very difficult for the user to identify that SSID 104 is authentic and should be trusted, while SSID 106 should not be trusted. Similarly, SSIDs 108 ("HotelFreeWiFi"), and 110 ("HotelFree Wifi") may each identify malicious or inauthentic WiFi networks. It is also difficult for a user to identify these as inauthentic and potentially malicious.

Figure 2:
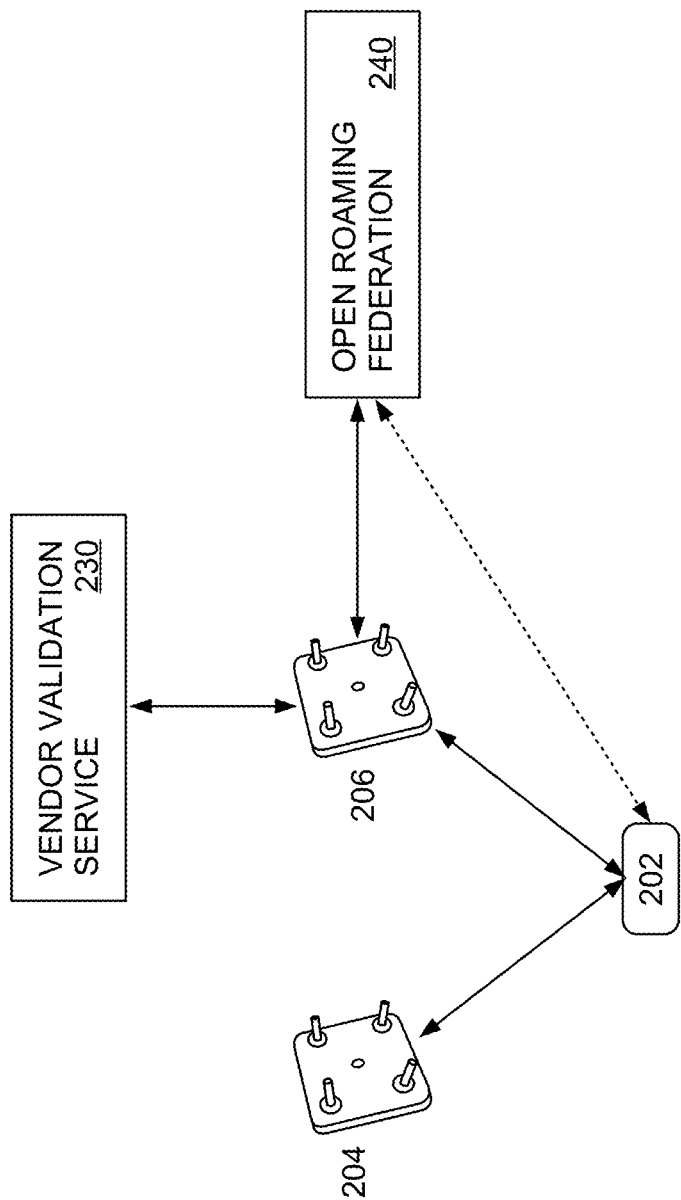
FIG. 2 illustrates a wireless station connecting with a WiFi network, according to one embodiment.

FIG. 2 illustrates an STA connecting with a WiFi network, according to one embodiment. An STA 202 seeks to connect to a WiFi network associated with one of two APs 204 and 206. Each AP is associated with a different wireless network with a different SSID. In an embodiment, the AP 206 is associated with a trusted WiFi network while the AP 204 is associated with a suspicious WiFi network.

In an embodiment, the STA 202 can communicate with either the AP 204 or the AP 206 (e.g., using a WiFi connection or another suitable wireless connection). The AP 206 is trusted, and so it is communicatively coupled with a vendor validation service 230 and an OpenRoaming Federation service 240. In an embodiment, the AP 206 is coupled to these services through any suitable wireless network (e.g., the Internet, a wide area network (WAN), a local area network (LAN), a cellular network, etc.). While the illustrated AP 206 is coupled to both a vendor validation service 230 and an OpenRoaming Federation service 240, in an embodiment the AP 206 is coupled to only one of these services.

The AP 204 is suspicious, and so it is not coupled to the vendor validation service 230 or the OpenRoaming Federation service 240. This is discussed further below. In an embodiment, the AP 204 may be connected to a suitable wireless network (e.g., the Internet), but because it is not trusted it cannot make a valid connection with the vendor validation service 230 (e.g., because the AP and/or its location is not registered with the vendor) or the OpenRoaming Federation service 240 (e.g., because the AP is not registered with the OpenRoaming Federation).

FIG. 3 is a block diagram illustrating a wireless STA 300 and an AP 350, according to one embodiment. The STA 300 includes a processor 302, a memory 310, and network components 320. The processor 302 generally retrieves and executes programming instructions stored in the memory 310. The processor 302 is included to be representative of a single central processing unit (CPU), multiple CPUs, a single CPU having multiple processing cores, graphics processing units (GPUs) having multiple execution paths, and the like.

The network components 320 include the components necessary for the STA 300 to interface with a wireless communication network, as discussed above in relation to FIGS. 1-2. For example, the network components 320 can include WiFi or cellular network interface components and associated software.

Although the memory 310 is shown as a single entity, the memory 310 may include one or more memory devices having blocks of memory associated with physical addresses, such as random access memory (RAM), read only memory (ROM), flash memory, or other types of volatile and/or non-volatile memory. The memory 310 generally includes program code for performing various functions related to use of the STA 300. The program code is generally described as various functional "applications" or "modules" within the memory 310, although alternate implementations may have different functions and/or combinations of functions.

Within the memory 310, an SSID verification module 312 facilitates identifying and verifying trusted SSIDs, as discussed in subsequent figures. A machine learning verification module 314 uses ML techniques to identify trusted and untrusted SSIDs. For example, as discussed above, computer vision techniques can be used with the machine learning verification module 314 to identify (and mark as suspicious) SSIDs that appear visually similar to trusted SSIDs while actually using different characters. This is discussed further with regard to subsequent Figures, including FIG. 9.

The AP 350 includes a processor 352, a memory 360, and network components 370. The processor 352 generally retrieves and executes programming instructions stored in the memory 360. The processor 352 is included to be representative of a single central processing unit (CPU), multiple CPUs, a single CPU having multiple processing cores, graphics processing units (GPUs) having multiple execution paths, and the like.

The network components 370 include the components necessary for the AP 350 to interface with a wireless communication network, as discussed above in relation to FIGS. 1-2. For example, the network components 370 can include WiFi or cellular network interface components and associated software.

Although the memory 360 is shown as a single entity, the memory 360 may include one or more memory devices having blocks of memory associated with physical addresses, such as random access memory (RAM), read only memory (ROM), flash memory, or other types of volatile and/or non-volatile memory. The memory 360 generally includes program code for performing various functions related to use of the AP 350. The program code is generally described as various functional "applications" or "modules" within the memory 360, although alternate implementations may have different functions and/or combinations of functions.

Within the memory 360, the SSID verification module 362 facilitates identification of a trusted SSID by an STA (e.g., the STA 300). The trusted authority module 364 facilitates communication with a trusted authority (e.g., an OpenRoaming authority) to assist in identification of a trusted SSID by an STA. This is discussed further in relation to FIG. 4 and after.

Figure 4:
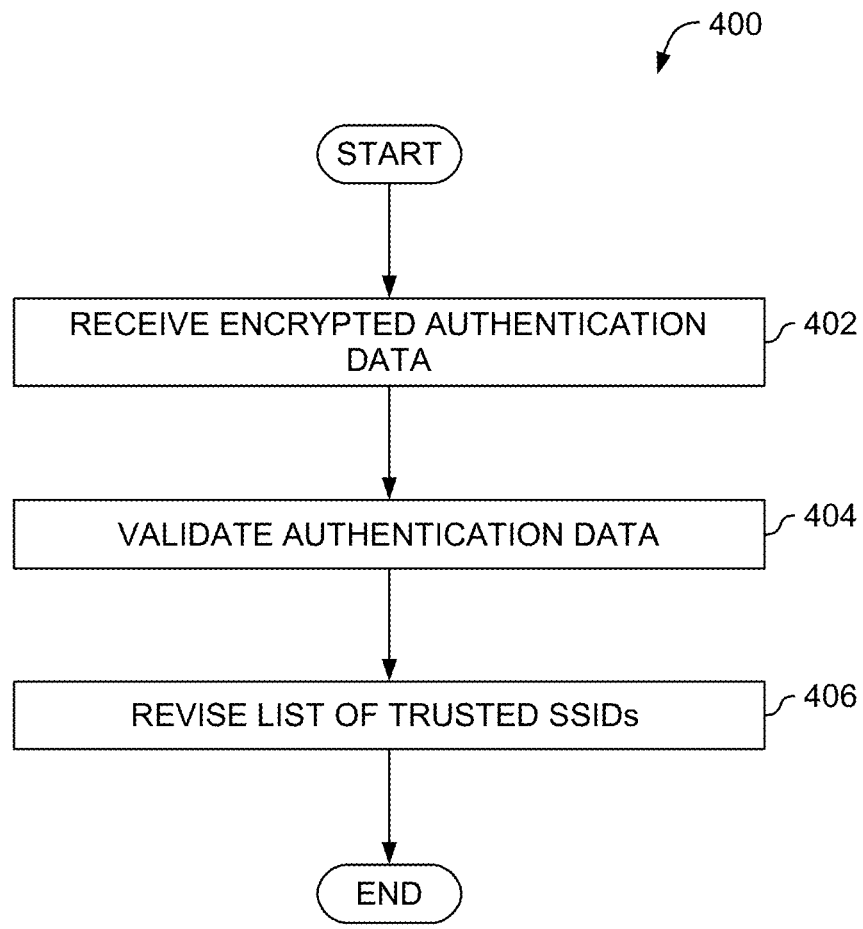
FIG. 4 is a flowchart for identifying trusted SSIDs for WiFi networks, according to an embodiment.

FIG. 4 is a flowchart 400 for identifying trusted SSIDs for WiFi networks, according to an embodiment. At block 402, an SSID verification module (e.g., the SSID verification module 312 in the STA 300 illustrated in FIG. 3) receives encrypted authentication data from an AP. In an embodiment, an STA (e.g., the STA 300 illustrated in FIG. 3) can authenticate an SSID based on receiving authentication data from an AP associated with the SSID. For example, the AP can advertise verification data to the STA in an attribute field in a beacon or probe response. This information can include, for example, the SSID, the network owner, the location, etc. In an embodiment, the verification data is encrypted (e.g., using public key encryption). In an embodiment, the STA requests the authentication data from the AP. Alternatively, or in addition, the AP advertises the authentication data to the AP unprompted.

At block 404, the SSID verification module validates the authentication data. In an embodiment, the STA wishing to join the network associated with the AP can use the advertised authentication information from the AP to verify the authenticity of the AP (e.g., directly or through a trusted source). This is discussed further with regard to FIG. 5, below. But assuming the authentication data is encrypted using public key encrypting, the STA must have keying information (e.g., the associated public key) in order to decrypt and validate the authentication data. Because the STA has not yet connected with the network, and does not yet trust the network associated with the AP, it cannot receive the keying information from the AP.

Instead, as discussed further below with regard to FIG. 5, the STA can receive the keying information in numerous ways. In one embodiment, a vendor can provide a public key in a vendor-specific application. For example, a vendor (e.g., a hotel chain or coffee shop chain) could include in an App to be installed on a user's device that includes a listing of acceptable SSID values (or partial values) along with keying information. The vendor could encourage customers to install the App on their local device prior to visiting the vendor, and the customer could use the App across multiple locations associated with the vendor.

In another embodiment, the STA can use a Generic Advertisement Service (GAS) exchange to validate the SSID using a trusted third party. For example, the STA could contact the OpenRoaming Federation to authenticate the SSID. This can be done either directly between the STA and the trusted third party (e.g., the OpenRoaming Federation server) or using the AP as a pass-through or relay. In another embodiment, the STA can use a trusted vendor of the AP or associated network hardware to validate the SSID. For example, the STA could query the AP vendor using a key associated with the AP vendor, and could use the response to validate the AP.

At block 406, the SSID verification module revises its list of trusted SSIDs based on the validated (or not validated) authentication data. For example, returning to FIG. 1, the STA could modify the list of SSIDs to reflect the trusted SSIDs. In an embodiment, the STA removes (or disables) untrusted SSIDs from the list, leaving only trusted SSIDs. Alternatively, the STA marks untrusted SSIDs (e.g., with a warning label) to discourage the user from attempting to connect to the associated network. As another alternative, or in addition, the STA marks trusted SSIDs to reflect their trusted status. As another alternative, the STA automatically connects to a trusted SSID.

Figure 5:
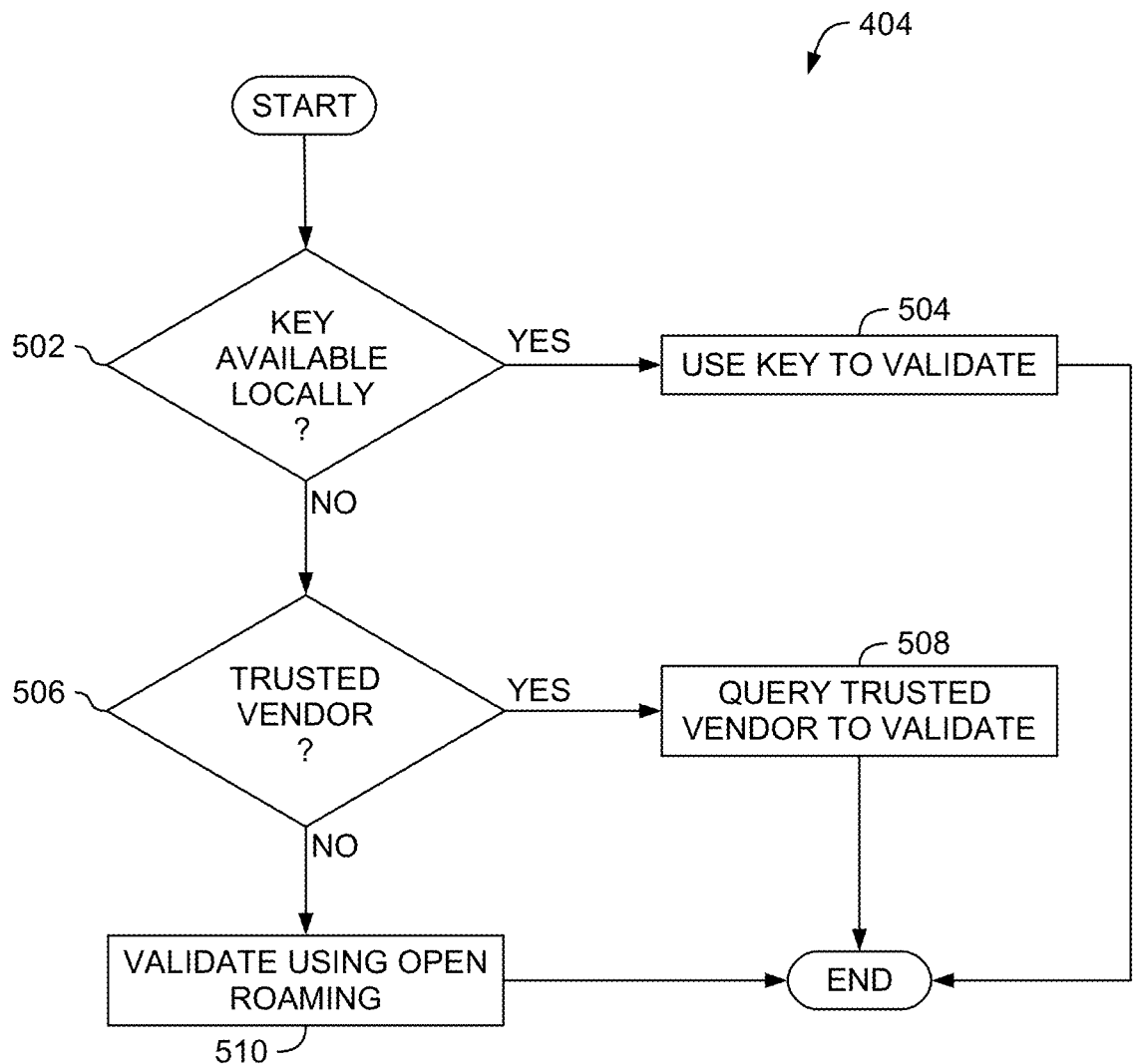
FIG. 5 is a flowchart for validating SSID authentication data, according to an embodiment.

FIG. 5 is a flowchart for validating SSID authentication data, according to an embodiment. In an embodiment, FIG. 5 corresponds with block 404 in FIG. 4. At block 502 an SSID verification module (e.g., the SSID verification module 312 in the STA 300 illustrated in FIG. 3) receives encrypted authentication data from an AP (e.g., the authentication data received at block 402 illustrated in FIG. 4).

For example, in an embodiment and as discussed above, a vendor (e.g., a hotel or a coffee shop) provides an App for users. The App can include SSID strings allowed by the vendor, along with keying material (e.g., a public encryption key, location information, etc.). The STA can determine whether a suitable App is installed locally (e.g., based on the SSID string) and whether suitable keying information (e.g., a public key to decrypt the authentication data) is available on the STA. If so, the flow proceeds to block 504.

At block 504, the SSID verification module uses the local keying information (e.g., stored with the App) to validate the authentication data. For example, the STA can confirm that the SSID string being verified is included in the list of allowed SSID strings in the App. In an embodiment, where a vendor uses a limited number of SSID strings across all of its location (e.g., "VendorName Guest"), the App can include full SSID strings. Alternatively, or in addition, a vendor can include allowed partial SSID strings, to allow for SSIDs that vary in predictable ways across locations. For example, the App could require that the SSID string begin, or end, with a particular SSID string while allowing other characters to vary (e.g., "VendorName-PropertyLocation"). The STA can use this to validate the SSID.

The STA can further use the public key in the App to decrypt the authentication data, and can use keying data in the authentication data to validate the authentication data. For example, the authentication can include a location (e.g., a range of GPS coordinates). The STA can use a key to decrypt the authentication data and decipher this location, and then the STA can confirm that its current location matches the allowed location included in the authentication data. This is merely one example, and other suitable keying information can also be used. Returning to block 502, if the keying information is not available locally, the flow proceeds to block 506.

At block 506, the SSID verification module determines whether a trusted vendor is available to validate the authentication data. For example, an STA can be configured to use a trusted vendor (e.g., a vendor of network components or security solutions) to validate the authentication data. If so, the flow proceeds to block 508.

At block 508, the SSID verification module validates the authentication data using the trusted vendor. In an embodiment, the SSID verification module contacts the trusted vendor. For example, the SSID verification module can retrieve keying material associated with the vendor (e.g., a public key) from a known certificate provider. The SSID verification module can then encrypt the SSID and AP identifying information (e.g., a MAC address of the AP, a hash of the MAC address of the AP, location information, etc.) in a message (e.g., using the vendor's key).

In an embodiment, if the STA has an existing network connection (e.g., a cellular connection), the SSID verification module can transmit the encrypted message to the trusted vendor without using the AP. Alternatively, or in an addition, the SSID verification module can transmit the encrypted message to the trusted vendor through the AP (e.g., if the STA does not otherwise have a network connection). Because the message is encrypted using the vendor key, the AP cannot modify the message (e.g., even if the AP is malicious).

The AP forwards the message to the trusted vendor. The vendor can then provide an encrypted reply (e.g., the SSID is valid or invalid, encrypted using the vendor's key) through the AP to the STA. In an embodiment, this can be implemented using the Cisco DNA Spaces platform and the location of the AP can be used in the verification. Returning to block 506, if the trusted vendor feature is not available, the flow proceeds to block 510.

At block 510, the SSID verification module validates the authentication data using a trusted third party (e.g., the OpenRoaming Federation). In an embodiment, both the STA and the AP are subscribed to OpenRoaming (or another suitable trusted third party service). The SSID verification module can then use a pre-association GAS exchange to validate the authentication data. For example, as discussed above in relation to block 402 in FIG. 4, the STA can detect a Basic Service Set Identifier (BSSID) (e.g., as part of a beacon or probe response) from the AP with a vendor attribute containing encrypted authentication data.

If the STA has an existing network connection (e.g., a cellular connection), the STA can contact the OpenRoaming Federation using its provider network (e.g., a cellular provider network, since the STA has likely not yet connected to a WiFi network). In an embodiment, the provider network maintains an address for a trusted OpenRoaming Federation server. The STA uses the provider network to query this OpenRoaming Federation server and validate the authentication data.

Alternatively, or in addition, the STA can use GAS to query the OpenRoaming Federation through the AP (e.g., if the STA does not have an existing network connection). For example, the STA can use GAS to provide an OpenRoaming query to the AP. The AP will only be able to query the OpenRoaming Federation if the AP is valid and trusted, and so the STA can wait for a response. If the STA receives a valid response (e.g., from the AP, or alternatively from an OpenRoaming server) the AP is trusted. In an embodiment, the message from the STA to the OpenRoaming Federation is encrypted in both directions (e.g., with a certification associated with the OpenRoaming Federation) to ensure the AP does not modify the message or response.

In an embodiment, if the STA does not receive a valid response from the AP to the OpenRoaming query (e.g., the STA receives an invalid response, or a timer expires waiting for a response), the STA can try again. This can avoid assuming an AP is untrusted when, instead, the OpenRoaming server is unavailable. Further, in an embodiment, the STA can further verify the AP using the authentication information itself. For example, the OpenRoaming server can return to the STA (e.g., directly or through the AP) a message including location data or other identification data. The STA can verify that the AP is in the expected location or otherwise matches the identification data.

The flowchart illustrated in FIG. 5 includes all three blocks 504, 506, and 508. In an embodiment, an SSID verification module includes all three features, as described. Alternatively, an SSID verification module can include only one of these three features, or two of the three. For example, an SSID verification module may only use a trusted vendor to validate the authentication data (e.g., as described in connection with block 508). The SSID verification module need not check for key data available locally, and need not provide the option to validate the authentication using a trusted third party. Any, or all, of these three alternatives can be used in a given embodiment.

Figure 6:
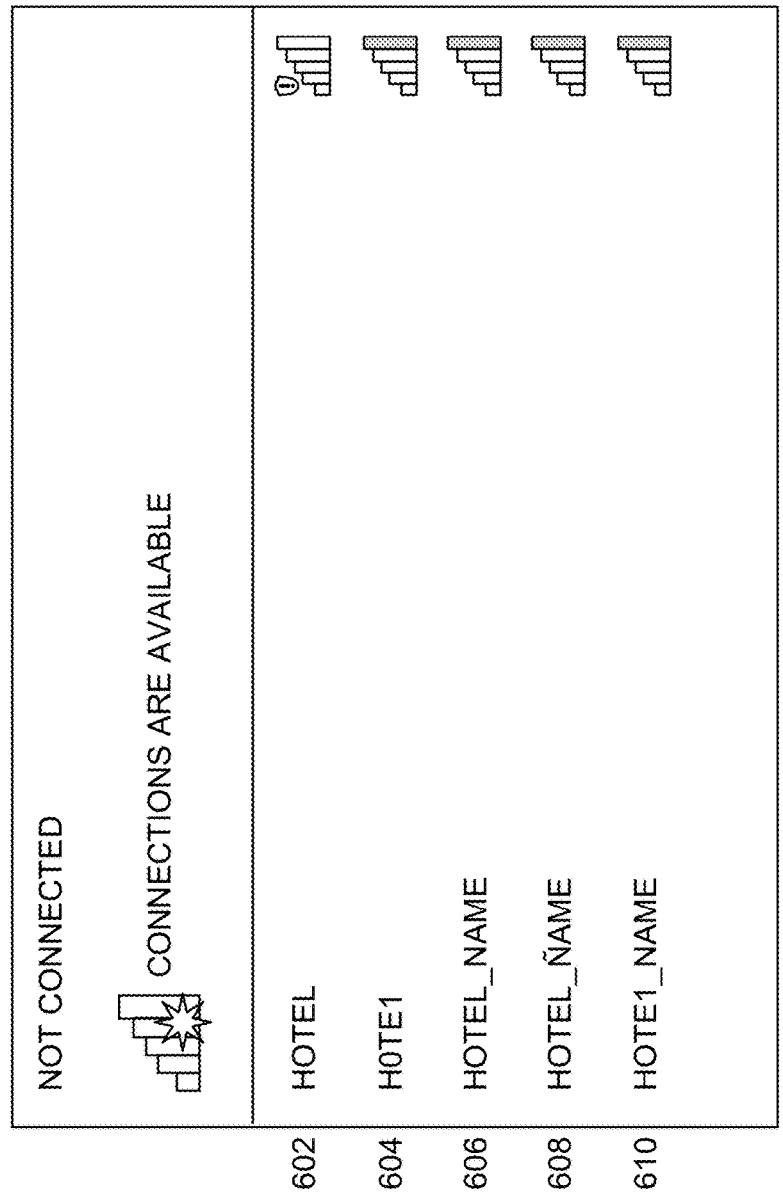
FIG. 6 illustrates a visually similar listing of trusted and malicious SSIDs for WiFi networks, according to one embodiment.

FIG. 6 illustrates a visually similar listing 600 of trusted and malicious SSIDs for WiFi networks, according to one embodiment. In an embodiment, the listing 600 includes an SSID 602, "HOTEL." This SSID 602 could, for example, be a valid SSID associated with a network used for Hotel employees. The listing 600 further includes an SSID 604, "H0TE1", in which the letter "O" in SSID 602 has been replaced with a number "0" and the letter "L" has been replaced with a number "1." This SSID 604 could be associated with a malicious network. Because the SSID 604 appears visually similar to the SSID 602, a user could be confused and attempt to connect to SSID 604, thinking that it is the proper trusted SSID. Similarly, the SSID 606, "HOTEL_NAME", could be an SSID for a trusted hotel guest network. The SSIDs 608, "HOTEL_ÑAME", and 610, "H0TE1_NAME", appear visually similar but, for example, could correspond with malicious networks.

Figure 7:
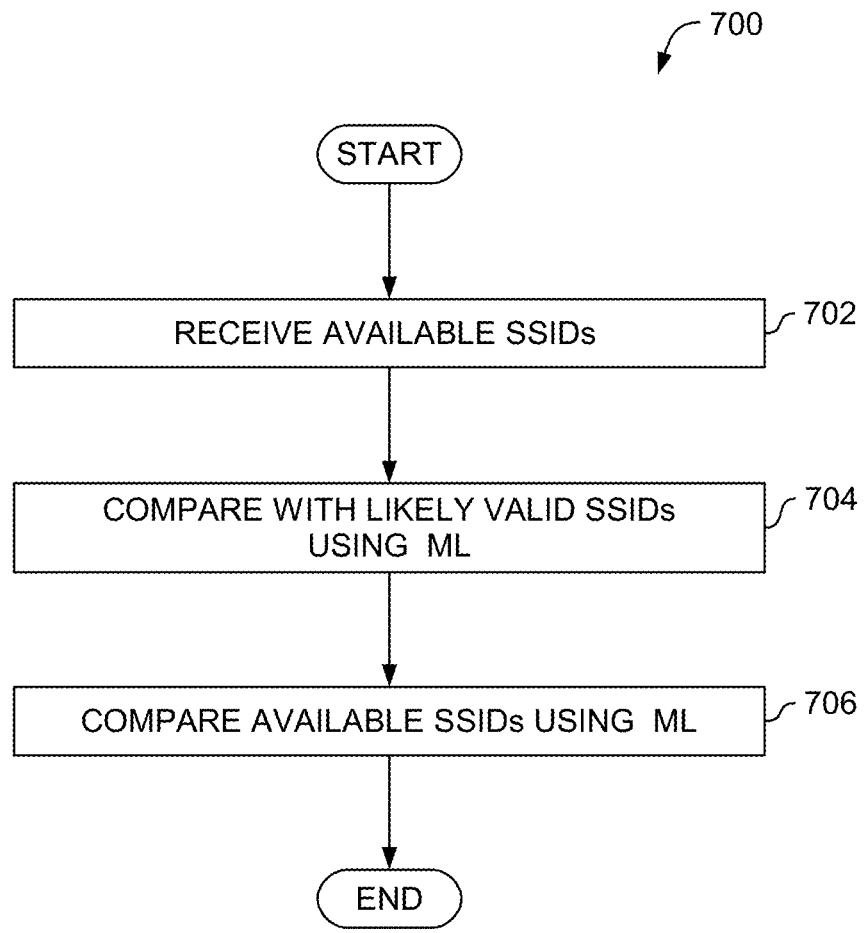
FIG. 7 illustrates identifying trusted SSIDs among a listing of trusted and malicious SSIDs for WiFi networks, according to one embodiment.

FIG. 7 illustrates identifying trusted SSIDs among listing of trusted and malicious SSIDs for WiFi networks, according to one embodiment. In an embodiment, the techniques for identifying trusted SSIDs, discussed above with regard to FIGS. 4 and 5, may not be available or may not be conclusive. These techniques can be augmented by using ML techniques to identify SSIDs that appear suspicious or are likely to be valid. At block 702 a machine learning verification module (e.g., the machine learning verification module 314 running on the STA 300 illustrated in FIG. 3) receives the available SSIDs (e.g., the SSIDs 602, 604, 606, 608, and 610 illustrated in FIG. 6).

At block 704, the machine learning verification module compares the received SSIDs with likely valid SSIDs, using ML (e.g., a supervised machine learning module). ML techniques are discussed further below with regard to FIG. 9. In an embodiment, the machine learning verification module can compare the received SSIDs with multiple different sources of likely valid SSIDs. For example, the machine learning module can access (or maintain) a list of SSIDs to which the STA has previously connected. Because the STA previously connected to these networks, the SSIDs are likely to represent valid SSIDs. Alternatively, or in addition, the machine learning module can be pre-populated with a whitelist of commonly used valid SSIDs (e.g., associated with common vendors).

ML techniques can then be used to identify which of the received available SSIDs are likely to be valid and which are suspicious, based on the likely valid SSIDs. For example, an ML model can be used to identify SSIDs that appear similar to valid SSIDs, but that are different in suspicious ways: replacing the letter "O" with the number "0", replacing the letter "I" with the number "1", including unusual Unicode characters, including unusual spaces or tabs, etc. The ML model can be trained with trusted, and suspicious, SSIDs, and can be used to identify likely suspicious SSIDs. Similarly, the ML model can be used to identify patterns in valid SSIDs (e.g., patterns in how vendors name SSIDs) and thereby identify likely valid SSIDs based on these patterns.

In an embodiment, the ML techniques can operate on the characters of the SSID. For example, Natural Language Processing (NLP) fuzzy string matching techniques can be used. Alternatively, or in addition, the ML techniques (e.g., a convolutional neural network) can operate on a visual representation of the SSID (e.g., an image, like a screenshot, of the SSIDs). This can allow the ML techniques to identify SSIDs that appear visually suspicious, regardless of the underlying characters making up the SSID. This is discussed further with regard to FIG. 8, below.

At block 706, the machine learning verification module compares the available SSIDs to each other, using ML techniques. As discussed above, in an environment, the machine learning verification module can compare the available SSIDs to likely valid SSIDs. Alternatively, or in addition, the machine learning verification module can compare the SSIDs to each other. For example, the machine learning verification module could compare the SSID 602 illustrated in FIG. 6 with the SSID 604. Using ML techniques, it could determine that the replacement of letters in the SSID 602 (e.g., "O" and L") with numbers in the SSID 604 (e.g., "0" and "1") makes the SSID 604 suspicious. This can be done based on a comparison of the available SSIDs themselves, without requiring a list of likely trusted SSIDs.

In an embodiment, just as for block 704, at block 706 the ML techniques can operate on the characters of the SSID (e.g., using NLP fuzzy string matching techniques). Alternatively, or in addition, the ML techniques at block 706 (e.g., a convolutional neural network) can operate on a visual representation of the SSID (e.g., an image, like a screenshot, of the SSIDs). This can allow the ML techniques to identify SSIDs that appear visually suspicious, regardless of the underlying characters making up the SSID. This is again discussed further with regard to FIG. 8, below.

Figure 8:
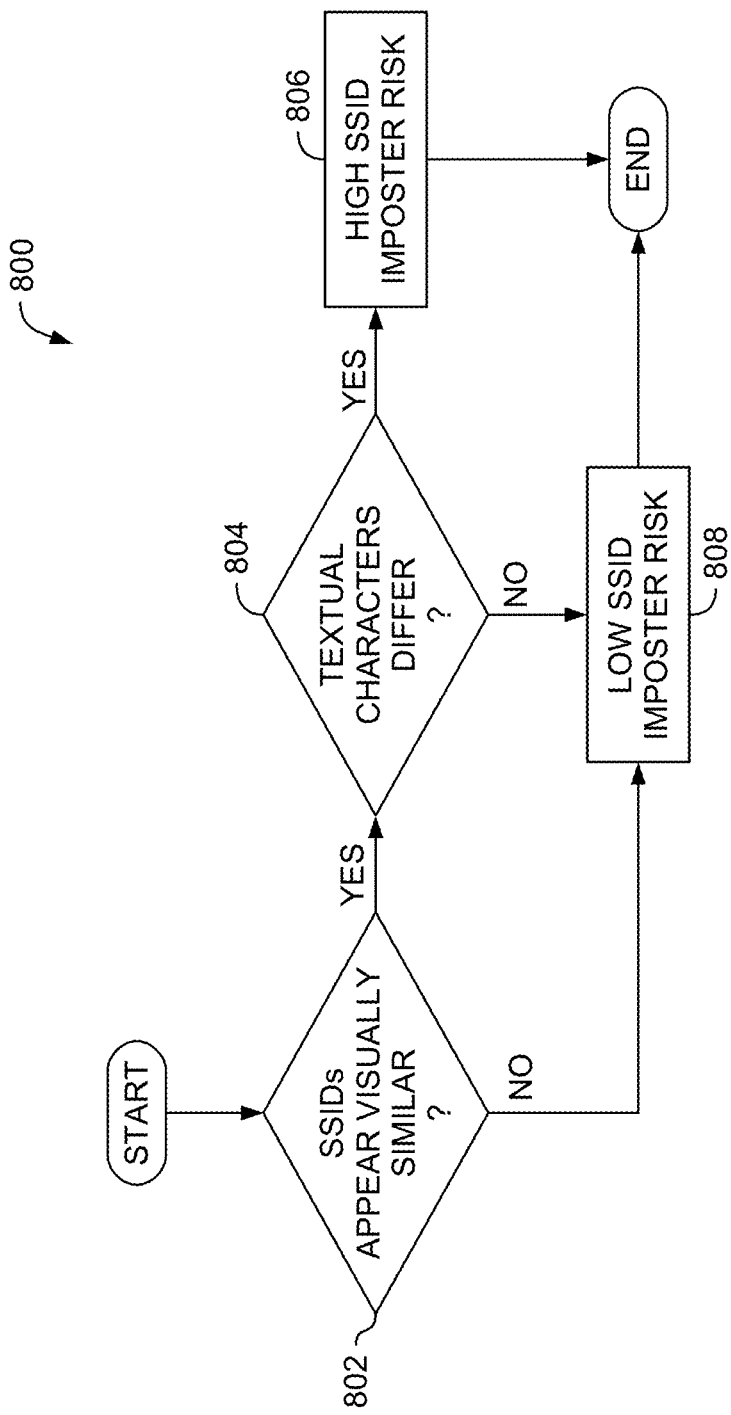
FIG. 8 is a flowchart for identifying trusted SSIDs among a visually similar listing of trusted and malicious SSIDs for WiFi networks, according to one embodiment.

FIG. 8 is a flowchart 800 for identifying trusted SSIDs among a visually similar listing of trusted and malicious SSIDs for WiFi networks, according to one embodiment. At block 802, a machine learning verification module (e.g., the machine learning verification module 314 running on the STA 300 illustrated in FIG. 3) determines whether a pair of SSIDs are visually similar. In an embodiment, the pair of SSIDs can be an available SSID and a known likely trusted SSID (e.g., as discussed above with regard to block 704 in FIG. 7). Alternatively, the pair of SSIDs can both be available SSIDs (e.g., as discussed above with regard to block 706 in FIG. 7).

In an embodiment, the machine learning verification module can capture images of the SSIDs, and computer vision techniques can be used with ML to determine the visual similarity of the images. For example, a convolutional neural network can be used to compare the images, and determine a percentage of similarity. A convolutional neural network is merely one example, and other suitable computer vision and ML techniques can be used (e.g., another neural network, or another ML technique). If the SSIDs appear sufficiently visual similar, the flow proceeds to block 804. In an embodiment, this is determined by comparing the percentage of visual similarity to a threshold value. This threshold can be pre-determined, can be configured by a user, or can be dynamically determined by the machine learning verification module.

At block 804, the machine learning verification module determines whether the text characters (e.g., of the pair of SSIDs analyzed at block 802) differ. For example, as illustrated in FIG. 6, the SSIDs 602 and 604 may appear sufficiently visually similar, but the underlying text characters actually differ. This is a suspicious sign, as malicious parties are likely to generate SSIDs that appear visually similar to trusted SSIDs (e.g., to encourage a user to join) while actually differing in their underlying characters.

If the textual characters differ, the flow proceeds to block 806 and the machine learning verification module identifies a high SSID imposter risk for the SSIDs. In an embodiment, this is determined by comparing the character similarity to a threshold value. This threshold can be pre-determined, can be configured by a user, or can be dynamically determined by the machine learning verification module. If the textual characters do not differ (or do not differ enough), the flow proceeds to block 808 and the machine learning verification module identifies a low SSID imposter risk for the SSIDs.

In an embodiment, the machine learning verification module can compare multiple pairs of SSIDs to identify which SSIDs are likely to be suspicious. This can be used to identify which SSID, in a pair of SSIDs that share visual similarity but not character similarity, is likely to be trusted and which is suspicious (or, alternatively, to determine that both are likely trusted or both are suspicious). For example, an available SSID that is in a suspicious pair, but shares both visual similarity and characters with a different likely to be trusted SSID can be marked as likely trusted. While an SSID that shares visual similarity with a trusted SSID, but does not share character similarity with any trusted SSID, is suspicious.

Figure 9:
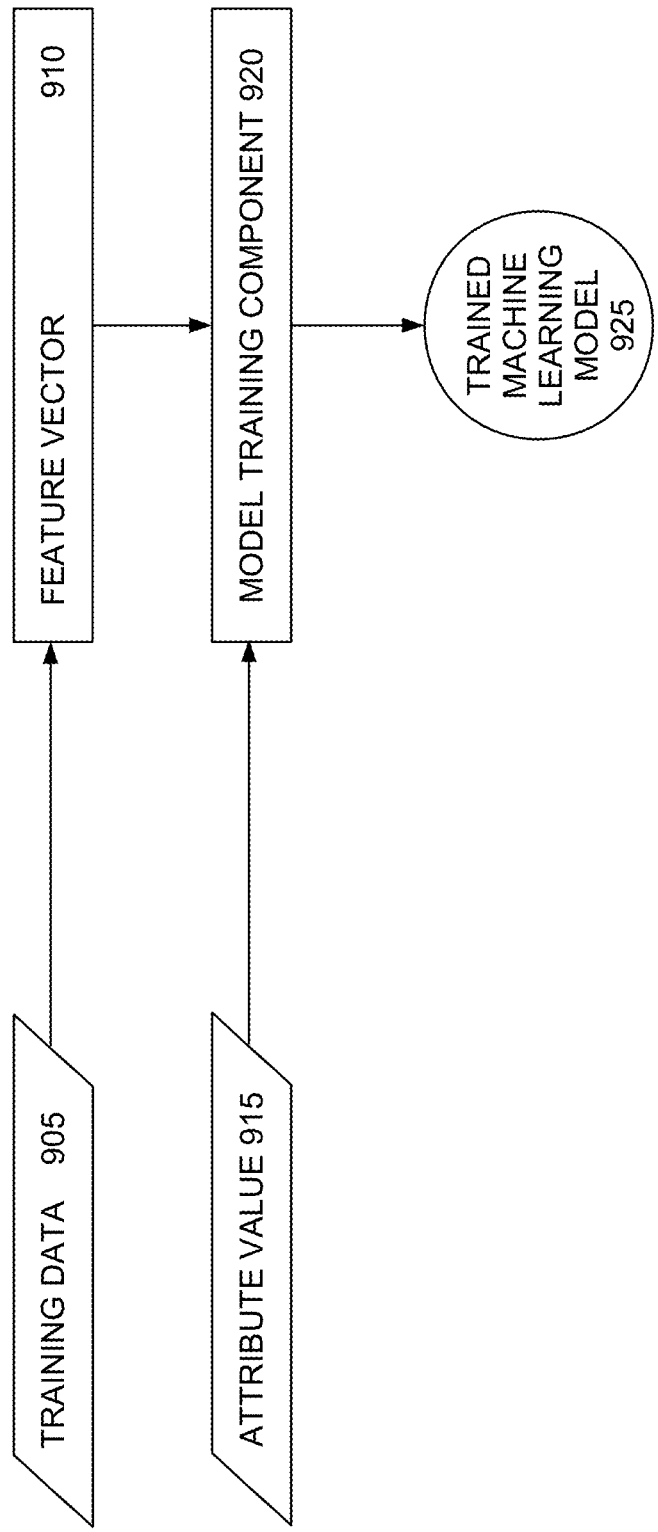
FIG. 9 illustrates generating and updating a supervised machine learning model, according to an embodiment.

FIG. 9 illustrates generating and updating a supervised ML model, according to an embodiment. As used herein, "trained machine learning" is used interchangeably with "supervised machine learning," and generally refers to ML that utilizes exemplars and pre-determined attribute scores to train the model. As illustrated, a corpus of training data 905 is converted into feature vectors 910. These feature vectors 910 are provided to a model training component 920, along with a set of associated attribute values 915. That is, the training data 905 is associated with one or more attribute values 915 for the principle attributes used by the system, wherein each of the one or more attribute values 915 represents a measure of an attribute indicated by the corresponding training data 905. The model training component 920 uses supervised machine learning techniques to generate and update a trained machine learning model 925, which can then be used to process new electronic data. Such techniques may include classification and regression techniques (e.g., as discussed above in relation to FIGS. 7 and 8), among others. In this way, an updated model can be maintained.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method of identifying a trusted SSID for a wireless network, comprising:
   prior to establishing a connection with a wireless network comprising a service set identifier (SSID), receiving a network message at a wireless station (STA) from an access point (AP) associated with the wireless network;
   identifying, at the STA, an encrypted identifier in the network message, wherein the encrypted identifier comprises encrypted information relating to the wireless network comprising the SSID;
   validating, at the STA, the encrypted identifier comprising encrypted information relating to the wireless network, and in response determining that the AP corresponds to a trusted wireless network, wherein validating, at the STA, the encrypted identifier comprises:
   generating a query at the STA;
   encrypting the query at the STA;
   transmitting the query to a trusted third party service, wherein the query is transmitted from the STA to the third party service via the AP, and
   wherein the encrypting prevents the AP from modifying the query;
   receiving a response from the trusted third party service; and
   determining that the response is valid; and
   designating the SSID as trusted at the STA.

2. The method of claim 1, wherein validating, at the STA, the encrypted identifier comprises identifying in local storage at the STA a key associated with the SSID, and decrypting the encrypted identifier using the key.

3. The method of claim 2, further comprising validating the decrypted identifier based on at least one of a location of the STA, a location of the AP, an address associated with the STA, or an address associated with the AP.

4. The method of claim 1, wherein the query comprises a query to a third party federation and the response comprises a response from the third party federation.

5. The method of claim 4, wherein the transmitting the query comprises transmitting an encrypted message from the STA to a server for the third party federation through the AP.

6. The method of claim 1, wherein the trusted third party service comprises a trusted vendor associated with the AP, and wherein validating, at the STA, the encrypted identifier comprises:
identifying the trusted vendor associated with the AP;
decrypting the encrypted identifier using a key associated with the trusted vendor; and
validating the decrypted identifier, wherein the encrypted identifier is generated by the trusted vendor.

7. The method of claim 6, wherein the key associated with the trusted vendor is delivered to the STA by a service associated with the trusted vendor.

8. The method of claim 6, wherein validating the decrypted identifier comprises validating a location of the AP.

9. A wireless station (STA), comprising:
a processor; and
a memory storing a program, which, when executed on the processor, performs an operation, the operation comprising:
prior to establishing a connection with a wireless network comprising a service set identifier (SSID), receiving a network message from an access point (AP) associated with the wireless network;
identifying an encrypted identifier in the network message, wherein the encrypted identifier comprises encrypted information relating to the wireless network comprising the SSID;
validating the encrypted identifier comprising encrypted information relating to the wireless network, and in response determining that the AP corresponds to a trusted wireless network, wherein validating, at the STA, the encrypted identifier comprises:
generating a query at the STA;
encrypting the query at the STA;
transmitting the query to a trusted third party service, wherein the query is transmitted from the STA to the third party service via the AP, and wherein the encrypting prevents the AP from modifying the query;
receiving a response from the trusted third party service; and
determining that the response is valid; and
designating the SSID as trusted.

10. The STA of claim 9, wherein validating the encrypted identifier comprises identifying in local storage at the STA a key associated with the SSID, and decrypting the encrypted identifier using the key.

11. The STA of claim 10, further comprising validating the decrypted identifier based on at least one of a location of the STA, a location of the AP, an address associated with the STA, or an address associated with the AP.

12. The STA of claim 9, wherein the query comprises a query to a third party federation and the response comprises a response from the third party federation.

13. The STA of claim 12, wherein the transmitting the query comprises transmitting an encrypted message from the STA to a server for the third party federation through the AP.

14. The STA of claim 9, wherein the trusted third party service comprises a trusted vendor associated with the AP, and wherein validating, at the STA, the encrypted identifier comprises:
identifying the trusted vendor associated with the AP;
decrypting the encrypted identifier using a key associated with the trusted vendor; and
validating the decrypted identifier, wherein the encrypted identifier is generated by the trusted vendor.

15. A non-transitory computer program product comprising:
a non-transitory computer-readable storage medium having computer-readable program code embodied therewith, the computer-readable program code executable by one or more computer processors to perform an operation, the operation comprising:
prior to establishing a connection with a wireless network comprising a service set identifier (SSID), receiving a network message at a wireless station (STA) from an access point (AP) associated with the wireless network;
identifying an encrypted identifier in the network message, wherein the encrypted identifier comprises encrypted information relating to the wireless network comprising the SSID;
validating the encrypted identifier comprising encrypted information relating to the wireless network, and in response determining that the AP corresponds to a trusted wireless network, wherein validating, at the STA, the encrypted identifier comprises:
identifying a trusted vendor associated with the AP;
decrypting the encrypted identifier using a key associated with the trusted vendor, wherein the key is delivered to the STA by a service associated with the trusted vendor; and
validating the decrypted identifier, wherein the encrypted identifier is generated by the trusted vendor; and
designating the SSID as trusted.

16. The STA of claim 12, wherein the transmitting the query comprises transmitting a message from the STA to a server for the third party federation using a cellular provider network.

17. The STA of claim 14, wherein the key associated with the trusted vendor is delivered to the STA by a service associated with the trusted vendor.

* * * * *